United States Patent [19]
Roy et al.

[11] Patent Number: 5,600,459
[45] Date of Patent: Feb. 4, 1997

[54] MULTIPLE-SHUTTER FLAT-PANEL DISPLAY HAVING INDIVIDUALLY CONTROLLED PIXELS AND METHOD FOR MAKING SAME

[76] Inventors: Howard S. Roy, 2573 Stowe Ct., Northbrook, Ill. 60062-8103; Narinder P. Singh, 5 Newell Rd., #4, Palo Alto, Calif. 94303

[21] Appl. No.: 169,229

[22] Filed: Dec. 20, 1993

[51] Int. Cl.$^6$ .......................... G02F 1/133; G02F 1/1343
[52] U.S. Cl. ................................................. 349/42
[58] Field of Search ........................... 359/53, 59

[56] References Cited

U.S. PATENT DOCUMENTS

| | | | |
|---|---|---|---|
| 4,091,375 | 5/1978 | Robillard | 340/324 R |
| 4,820,222 | 4/1989 | Holmberg et al. | 445/3 |
| 4,946,259 | 8/1990 | Matino et al. | 350/339 F |
| 4,961,629 | 10/1990 | Kato | 350/332 |
| 5,062,690 | 11/1991 | Whetten | 359/59 |
| 5,162,931 | 11/1992 | Holmberg | 359/54 |
| 5,221,978 | 6/1993 | Heynderickx et al. | 359/53 |
| 5,247,289 | 9/1993 | Matsueda | 359/59 |
| 5,311,339 | 5/1994 | Fertig et al. | 359/53 |
| 5,418,636 | 5/1995 | Kawasaki | 359/59 |

FOREIGN PATENT DOCUMENTS

| | | |
|---|---|---|
| 62-87937 | 4/1987 | Japan . |
| 62-245222 | 10/1987 | Japan . |
| 64-77028 | 3/1989 | Japan . |
| 1-94323 | 4/1989 | Japan . |

OTHER PUBLICATIONS

Credelle, "Recent Trend in Color Avionic LCDS," *Information Display*, vol. 3, No. 10, (Pub. of S.I.D.), pp. 15–18, Nov. 1987.

Depp, et al., "Flat–Panel Displays," *Scientific American*, vol. 266, No. 3, pp. 90–92, 94–97, Mar. 1993.

Jenkins, et al., "Functional Testing of TFT/LCD Arrays," *IBM J. Res. Develop.*, vol. 36, No. 1, pp. 59–68, Jan. 1992.

O'Mare, *Liquid Crystal Flat Panel Displays: Manufacturing Science and Technology*, 1993, Van Nostrand Reinhold, New York, pp. 84–86 and 189–192.

*Primary Examiner*—Sara W. Crane
*Assistant Examiner*—Fetsum Abraham
*Attorney, Agent, or Firm*—Marshall, O'Toole, Gerstein, Murray & Borun

[57] ABSTRACT

A display having a plurality of pixel locations includes first and second display layers, each including a cell at each pixel location, wherein each cell includes a liquid-crystal layer for modulating light passing through the display and a capacitor for controlling the liquid-crystal layer. Also disclosed are a method of making a display in accordance with the present invention and a method of displaying a composite image.

29 Claims, 7 Drawing Sheets

PRIOR ART

MULTIPLE-SHUTTER FLAT-PANEL DISPLAY HAVING INDIVIDUALLY CONTROLLED PIXELS AND METHOD FOR MAKING SAME

TECHNICAL FIELD

This invention relates generally to displays and more particularly to a flat-panel display having two or more optical shutters at each pixel location of the display.

BACKGROUND ART

Flat-panel displays are commonly used as computer screens, television screens, and electronic game displays and in a variety of other applications. A typical flat-panel display is capable of displaying a composite image formed by a regular array of picture elements, or pixels. Moreover, the image displayed by a flat-panel display may be either monochrome or color, and the pixels of either type of display may be bi-state or multi-state. Bi-state pixels may assume two possible appearances corresponding to first and second levels of attenuation of light (e.g., on/off, light/dark, attenuated/unattenuated, color-1/color-2, etc.). Multi-state pixels may assume those two appearances, as well as up to an infinite number of further appearances corresponding to intermediate attenuation levels.

At each pixel location, light may be provided by a variety of means. For example, a light-emitting device such as a light-emitting diode or other electroluminescent component may be disposed at each pixel location. Alternatively, a backlight may be provided behind the display, and an optical shutter for selectively transmitting and blocking transmission of light may be located at each pixel location of the display. One example of such an optical-shutter-type flat-panel display is a liquid-crystal display (L.C.D.) having a liquid-crystal cell at each pixel location of the display.

Conventional L.C.D.'s include a liquid-crystal cell at each pixel location and a layer of liquid-crystal molecules disposed within each liquid-crystal cell. The liquid-crystal molecules are normally arranged in a twisted-nematic phase, preferably at an angle of about ninety degrees (or an odd-integer multiple thereof) along the path of transmission of light. However, when an electric field is applied across the liquid-crystal layer, the liquid-crystal molecules align with the electric field so that they are no longer arranged in a twisted-nematic phase. Such displays also include a pair of polarizing filters which are disposed on either side of the liquid-crystal cell and have perpendicular polarization directions.

A light source disposed behind the liquid-crystal display transmits light through the display toward a viewer. Alternatively, ambient light may be reflected through the display toward the viewer. In either case, as light passes through the display at a particular pixel location, the light is plane-polarized by the polarizing filter disposed on the surface at which the light enters the display. The plane-polarized light then encounters the liquid-crystal layer.

If the liquid-crystal molecules at the particular pixel location are arranged in a twisted-nematic phase (i.e., if no electric field is applied across the liquid-crystal layer at the pixel location), then the polarization direction of the plane-polarized light is rotated by the twisted-nematic liquid-crystal molecules as it passes through the liquid-crystal layer. The rotated, plane-polarized light then passes through the second polarizing filter which has a polarization direction parallel to the rotated, plane-polarized light. Consequently, the display appears light at the pixel location. If, on the other hand, the liquid-crystal molecules are aligned with an applied electric field, as described above, the polarization direction of the plane-polarized light is not rotated as the light passes through the liquid-crystal layer. In that case, the unrotated, plane-polarized light is blocked by the second polarizing filter, the polarization direction of which is then perpendicular to the unrotated, plane-polarized light. Consequently, the display appears dark at the pixel location.

A prior-art liquid-crystal display can be of either the active-matrix type or the passive-matrix type. These two types of displays differ in the manner in which the above-described electric field is applied across the liquid-crystal layer.

A passive-matrix display directly applies an electric field at a pixel location by applying a voltage across wires on either side of the liquid-crystal cell at the pixel location. Wires disposed on one side of the display are used to select the row of the pixel location where an electric field is to be applied, while wires disposed on the other side are used to select the column of the pixel Location. The liquid-crystal molecules in the cell at the intersection of two wires across which a voltage is applied remain aligned with the electric field while the voltage is maintained on the wires, whereas the liquid-crystal molecules in other cells remain arranged in a twisted-nematic phase.

In contrast, an active-matrix display includes a thin-film transistor and a capacitor at each pixel location. As in the passive-matrix display, the appearance of each pixel is controlled by an electric field applied thereto. However, in the active-matrix display, the electric field is developed by a charge deposited on the capacitor through the associated transistor at each pixel location.

As fabrication technologies for the thin-film transistors employed in prior-art active-matrix displays have improved, it has become possible to produce larger displays of greater resolution (i.e., the number of pixels per square unit of area) than could be produced previously. This increase in pixel density and number of pixels, however, also increases the probability that any given display will have an unacceptably large number of cell failures. This, in turn, results in an undesirable decrease in the yield of commercially acceptable displays. Further, because the defect density in produced displays increases with the size of the displays, it has not been economically feasible to construct large displays or displays having resolution and image quality characteristics sufficient for applications such as, for example, high-definition television (HDTV).

Passive-matrix displays typically have a relatively low defect density (i.e., few cell failures per display) and thus a relatively high production yield compared to active-matrix displays. Passive-matrix displays do not produce as sharp an image as active-matrix displays, however.

Numerous prior-art attempts have therefore been made to increase the production yield of active-matrix, liquid-crystal, flat-panel displays. Some of these attempts have involved the provision of redundant transistors and connective circuitry connected by laser-fusible links which are burned out of the flat-panel display using a laser if they are defective and which remain in the flat-panel display if they function properly. While it is possible to provide additional or more complex circuitry to operate a display of a given resolution in this manner, such an approach requires that the feature size of circuit components be decreased. This decrease in feature size creates an even greater likelihood of fabrication defects resulting in pixel failures which render a display commercially unacceptable. In addition, operative portions of such displays are often damaged by the very lasers used to burn out inoperative portions thereof. Further, some display failures are so severe that they cannot be overcome by the provision of redundant circuitry and cannot be repaired. The per-unit production cost of these displays is therefore quite high.

SUMMARY OF THE INVENTION

A display in accordance with the present invention has a plurality of pixel locations for displaying a composite image. In general, the display of the present invention can be based upon any variety of optically transmissive, light-modulating displays which can be stacked to provide two or more optically serial light-modulating means at each pixel location. Such a display has a markedly lower rate of pixel failures (and thus a higher production yield) than prior-art displays, which have only one layer. Consequently, displays in accordance with the present invention can be made larger than prior-art displays and, in many instances, at a lower average cost.

A method of displaying a composite image in accordance with the present invention includes the steps of providing first and second display layers, each having a plurality of pixel locations and a cell at each of the pixel locations, wherein each cell includes means for modulating light passing through the display at each pixel location and means for controlling the modulating means, combining the first and second display layers so that the pixel locations of the first display layer are aligned with corresponding pixel locations of the second display layer, and operating the controlling means to selectively control the modulating means of one or more of the cells at each of the pixel locations.

According to one aspect of the present invention, a display having a plurality of pixel locations includes at least first and second display layers, each including a cell at each pixel location, wherein each cell includes means for modulating light passing through the display and means for controlling the modulating means.

According to another aspect of the present invention, at least one of the display layers is a flat-panel display. In addition, the pixel locations of the display are arranged in an array, and preferably a regular array.

In accordance with one embodiment of the present invention, each cell at each of the pixel locations may be in first and second states. At a particular pixel location, light is substantially permitted to pass through the display at the particular pixel location when all of the cells at the particular pixel location are in the first state, and light is substantially blocked at the particular pixel location when a cell at the particular pixel location is in the second state.

Preferably, each controlling means comprises a capacitor and a thin-film transistor coupled to the capacitor and operable to selectively charge and discharge the capacitor, and the display also includes means for operating one or more of the thin-film transistors at each pixel location.

In accordance with another embodiment of the present invention, each of the display layers comprises three cells at each pixel location, each cell including means for modulating light passing through the display and means for controlling the modulating means and wherein the display further includes an optical filter associated with at least one of the cells at each pixel location.

In accordance with a preferred embodiment of the present invention, a flat-panel display having a plurality of pixel locations arranged in a regular array includes first and second display layers, each including a cell at each pixel location, wherein each cell includes a liquid-crystal layer which may be in first and second states for modulating light passing through the display and a capacitor for controlling the liquid-crystal layer. At a particular pixel location, light is substantially permitted to pass through the display at the particular pixel location when all of the liquid-crystal layers at the particular pixel location are in one of the states, and light is substantially blocked at the particular pixel location when at least one liquid-crystal layer at the particular pixel location is in the other state. Preferably, the liquid-crystal layer of a cell is in one state when the capacitor of that cell is charged and is in the other state when the capacitor of that cell is uncharged.

In accordance with a highly preferred variant of this embodiment, at least one of the capacitors at a pixel location stores a variable charge enabling the modulating means at the pixel location to variably attenuate light passing through the display at the pixel location.

In accordance with another variant of this embodiment, each of the display layers comprises three cells at each pixel location, each including a liquid-crystal layer for modulating light passing through the display and a capacitor for controlling the liquid-crystal layer, and the display further comprises an optical filter associated with at least one of the cells at each pixel location of a display layer.

A method of making a display for modulating light at each of a plurality of pixel locations of the display includes the steps of providing at least two display layers, each having a plurality of pixel locations and a cell at each of the pixel locations, providing means at each cell for modulating light passing through the display at each pixel location and means for controlling the modulating means, and combining the display layers so that corresponding pixel locations of the each of the display layers are aligned.

DESCRIPTION OF THE PREFERRED EMBODIMENTS

The key concept of the present invention is the provision of multiple, serial light-modulating means or optical shutters at each pixel location of a display as described below. Assuming that a failed pixel remains in a light-transmitting state, the display functions properly at a pixel location if at least one of the shutters at the pixel location functions properly and fails at a pixel location only if all shutters at the pixel location fail. The present invention can also be used in a display in which failed pixels remain in a light-blocking state provided that such failed pixels are rendered light-transmitting in any conventional manner. In either case, while the present invention, as described herein, is embodied in a liquid-crystal, flat-panel display, it should be noted that many other types of displays come within the scope of the present invention. Some examples from the prior art include displays which provide a mechanical shutter for blocking light at a pixel location, active-matrix and passive-matrix displays, plasma displays, deformable-mirror displays, and other shutter-type or light-transmissive displays.

Figure 1:
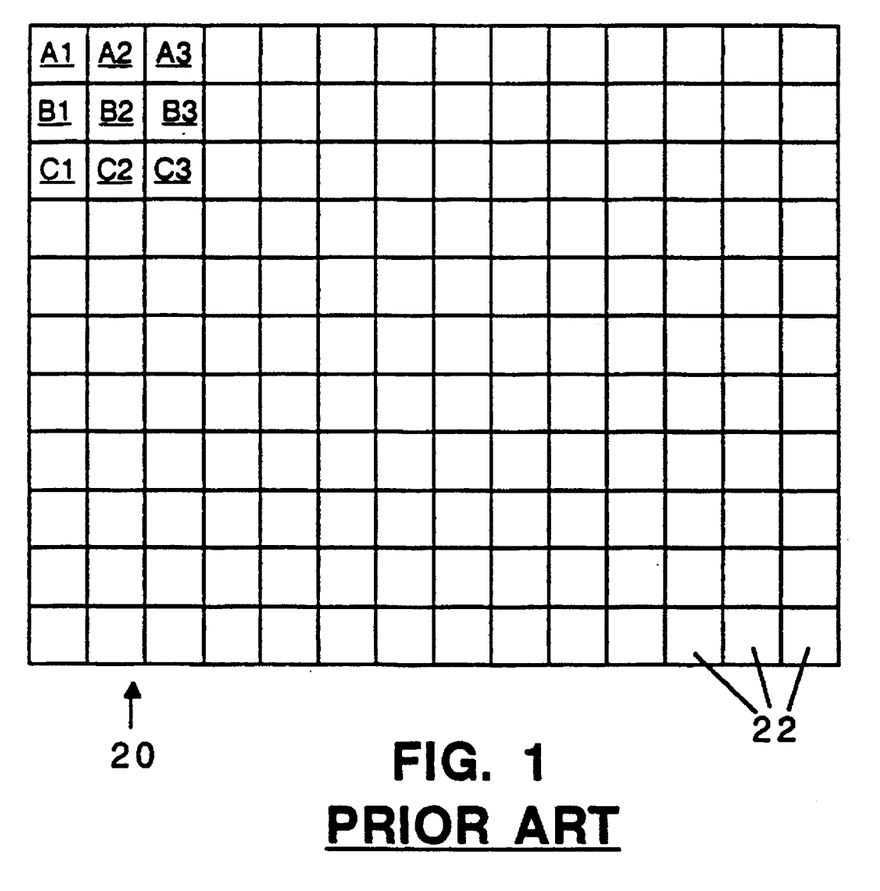
FIG. 1 comprises a diagrammatic view of a prior-art display.

Referring to FIG. 1, a prior-art, liquid-crystal, flat-panel display 20 includes a regular array of picture elements or pixels 22 which together are capable of forming a composite image on the flat-panel display 20.

The image formed by a liquid-crystal display may be bi-state or multi-state, and monochrome or color, and the present invention may be embodied in any of these types of displays. For simplicity, however, the present invention is described below primarily with reference to a monochrome, bi-state display. As necessary, details specifically relating to multi-state and color displays are also provided.

In a monochrome bi-state display, each pixel 22 may be in either of two states, namely light or dark. In a multi-state display, each pixel 22 variably attenuates light. In a color display, each pixel 22 comprises three sub-pixels capable of displaying red, blue, and green light, or of blocking light at the sub-pixel location. Each sub-pixel of a color display may variably attenuate light to provide red, blue, and green light in varying intensities. In any of these three types of displays, light is selectively modulated to produce a composite image.

Figure 2:
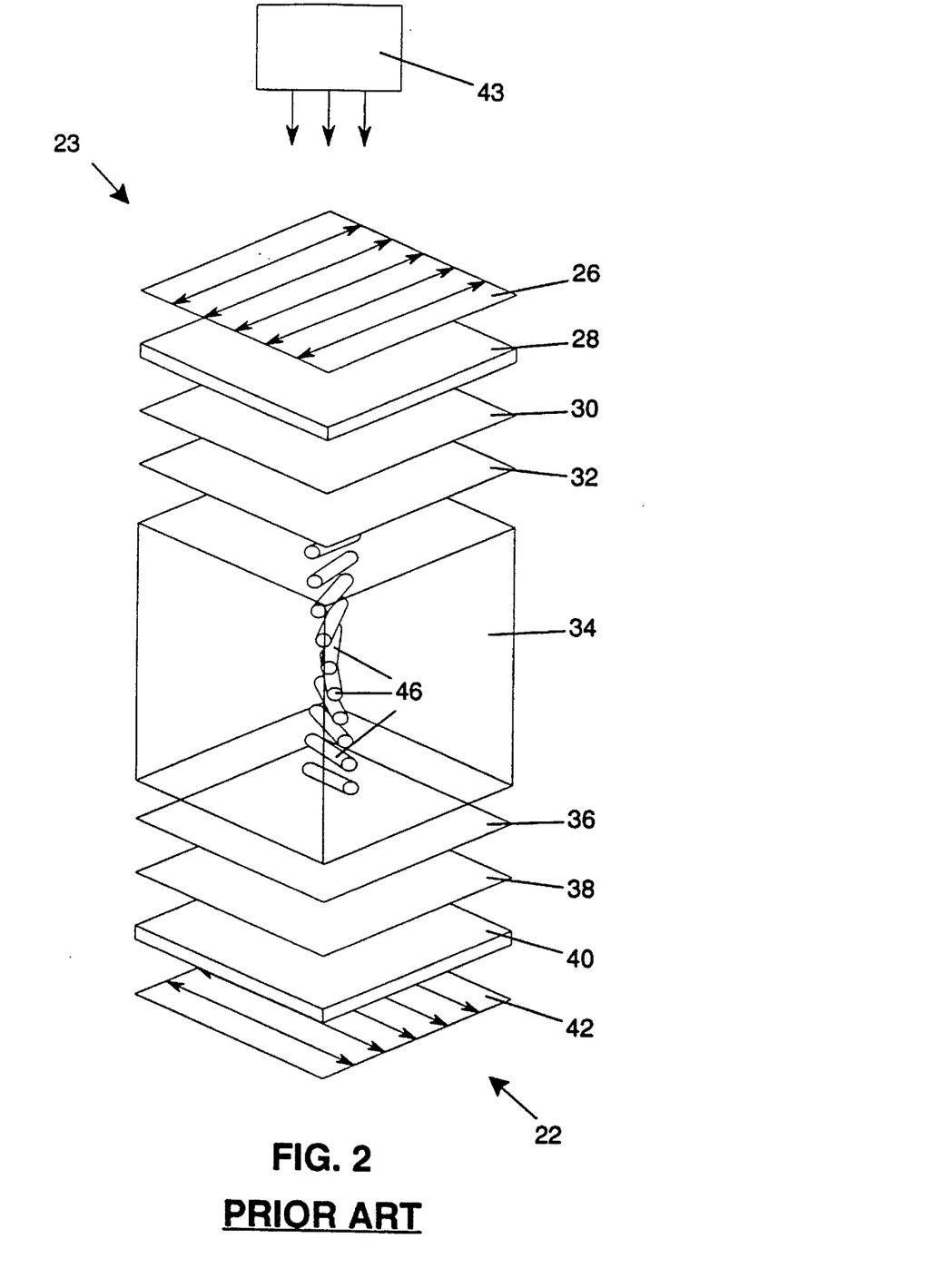
FIG. 2 comprises an exploded isometric view of a pixel location of the prior-art display of FIG. 1.

Referring now to FIG. 2, the structure of the prior-art liquid-crystal display 20 at one of the pixel locations 22 is now described in greater detail. The display 20 comprises a plurality of layers which together form a cell 23 at the pixel location 22. Specifically, the layers include an upper polarizing filter 26, an upper transparent glass substrate 28, a thin-film transistor array layer 30, an upper orientation membrane 32, a liquid-crystal layer 34, a lower orientation membrane 36, a transparent electrode film layer 38, a lower transparent glass substrate 40, and a lower polarizing filter 42.

The plane-polarizing filter 26 plane-polarizes light as it enters the display 20. Preferably, this light is provided by a light source 43 disposed above the display 20 as seen in FIG. 2, although reflected ambient light may be used in addition to or instead of this light.

Figure 3:
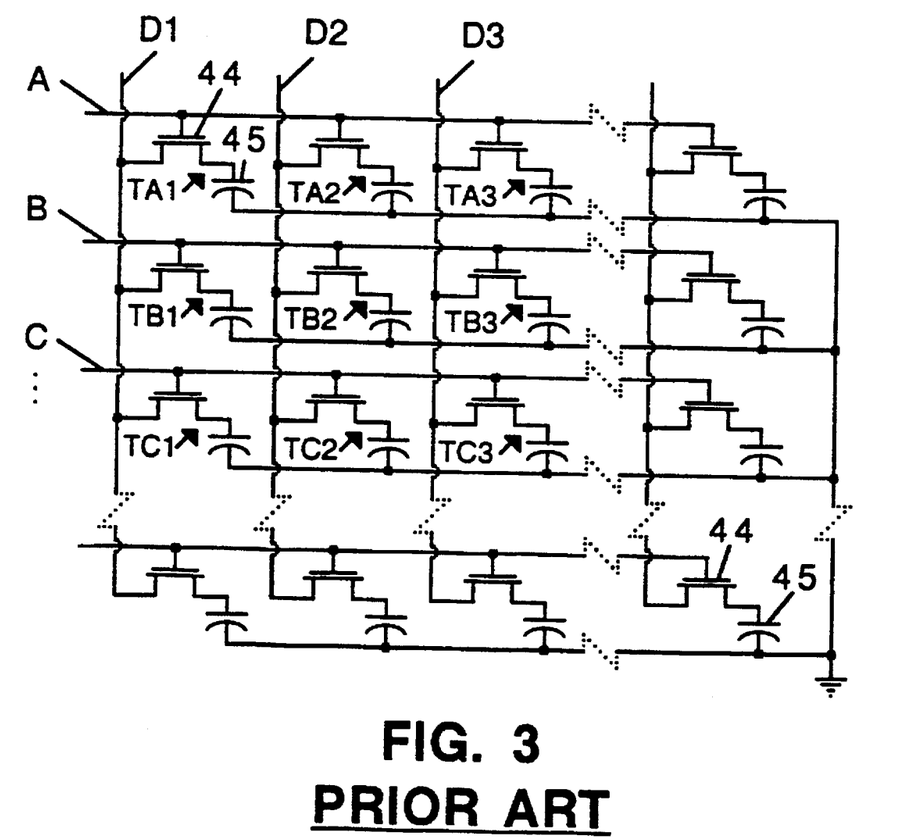
FIG. 3 comprises a partial schematic diagram of circuitry used in the prior-art display of FIG. 1.

Referring now to FIG. 3, at each pixel location 22 of the display 20, the thin-film-transistor array layer 30 includes a thin-film transistor 44 and one plate of a corresponding parallel-plate capacitor 45 (shown schematically in FIG. 3). The transparent electrode film layer 38 includes the second plate of the parallel-plate capacitor 45 at each pixel location 22. To illustrate the relationship between the transistor-capacitor pairs and the corresponding pixel locations 22, several transistor-capacitor pairs shown in the upper left-hand corner of the schematic of FIG. 3 are labeled TA1–TA3, TB1–TB3, and TC1–TC3. These transistor-capacitor pairs correspond to respective pixel locations 22 labeled A1–A3, B1–B3, and C1–C3 in FIG. 1.

During operation of the display 20, the transistors 44 are selectively turned on to charge and discharge the corresponding capacitors 45 in order to form a composite image on the display 20. In order to access a particular transistor 44 to charge or discharge the corresponding capacitor 45, the display 20 includes row or gate bus lines A, B, C, etc., and column or data bus lines D1, D2, D3, etc., each of which is connected to a respective row or column of transistors 44 in the thin-film-transistor array layer 30 of the display 20. As described above, each pixel of a bi-state display 20 may be in either of two states: a pixel has a first appearance when the corresponding capacitor 45 is charged and a second appearance when the corresponding capacitor 45 is uncharged.

A capacitor 45 is charged by applying a voltage at each of the row and column bus lines connected to the transistor 44 corresponding to the capacitor 45. For example, to store a charge on the capacitor 45 of the transistor-capacitor pair TB2, thereby causing the pixel at the corresponding pixel location B2 to assume the first appearance thereof, voltages are applied to the gate bus line B and the data bus line D2. When the voltage is removed from the gate bus line B, the transistor 44 of the transistor-capacitor pair TB2 turns off, and the capacitor 45 of the pair TB2 retains the charge stored thereon. When the voltage is removed from the data bus line D2 while a voltage remains on the gate bus line B, the capacitor 45 of the pair TB2 is discharged causing the pixel at the corresponding pixel location B2 to assume the second appearance thereof. Other capacitors 45 controlled by transistors 44 that are coupled to the gate bus line B are prevented by conventional means from being charged or discharged unintentionally while a voltage remains on the gate bus line B.

Referring again to FIG. 2, the upper transparent glass substrate 28 is disposed below the polarizing filter 26. The thin-film-transistor array layer 30 is fabricated on the lower surface of the substrate 28. The upper optically transparent orientation membrane 32 covers the lower surface of the thin-film-transistor array layer 30.

Next, the liquid-crystal layer 34 resides between the orientation membrane 32 and the lower orientation membrane 36 which covers the transparent electrode film layer 38 formed on an upper surface of a second transparent glass substrate 40. The lower surface of the orientation membrane 32 and the upper surface of the orientation membrane 36 are treated in any conventional manner known in the art to cause the twisted-nematic liquid-crystal molecules 46 in the liquid-crystal layer 34 to normally be twisted at an angle of ninety degrees between the orientation membranes 32 and 36.

A second capacitor plate of the capacitor 45, which is shown connected to ground in FIG. 3, is fabricated in the transparent electrode film layer 38 at each pixel location 22. The first and second capacitor plates together comprise the capacitor 45 which, when charged, creates an electric field across the liquid-crystal layer 34. Below the transparent glass substrate 40 is a second plane-polarizing filter 42 having a polarization direction perpendicular to the polarization direction of the first polarizing filter 26.

The thin-film-transistor array layer 30 preferably includes portions fabricated of a transparent, electrically conductive material such as indium tin oxide, and portions fabricated of a conventional semiconductor. The electrode film layer 38 is also preferably composed of indium tin oxide or another transparent, electrically conductive material.

The liquid-crystal layer 34 contains liquid-crystal molecules 46 which are normally arranged in a twisted-nematic phase and are normally twisted at an angle of substantially ninety degrees within the liquid-crystal layer 34. The polarization direction of light passing through the liquid-crystal layer 34 is rotated by an angle of ninety degrees by the twisted-nematic liquid-crystal molecules 46. Consequently, when there is no charge on the capacitor 45 at a pixel location 22, light passing through the display 20 at the pixel location 22 is first plane-polarized by the filter 26 and then passes through the substrate 28, the thin-film-transistor array layer 30, and the orientation membrane 32 disposed thereon. The polarization direction of the plane-polarized light is then rotated by an angle of ninety degrees as the light passes through the liquid-crystal layer 34. Next, the rotated, plane-polarized light passes through the orientation membrane 36, the electrode film layer 38, and the glass substrate 40. Finally, because the light is plane-polarized in a direction parallel to the polarization direction of the polarizing filter 42, the light passes through the polarizing filter 42. Hence, when the liquid-crystal molecules 46 are twisted, the display 20 assumes one appearance (e.g., it is substantially transparent or light) at the pixel location 22.

Conversely, when the capacitor 45 at a pixel location 22 is charged as described above, an electric field is applied across the liquid-crystal layer 34 at the pixel location 22 (from top to bottom as seen in FIG. 2). The electric field causes the liquid-crystal molecules 46 to align with the electric field so that the molecules 46 are no longer twisted. As a result, the polarization direction of the plane-polarized light is no longer rotated by an angle of ninety degrees as the light passes through the liquid-crystal layer 34. Thus, the light remains plane-polarized in a direction perpendicular to the polarization direction of the polarizing filter 42, and hence the plane-polarized light is unable to pass through the polarizing filter 42, and the display 20 assumes another appearance (e.g., it is substantially opaque or dark) at the pixel location 22.

Although the embodiment of the present invention described here employs liquid-crystal molecules 46 having a ninety-degree twist, the inventive concept is equally applicable to displays employing "super-twisted" liquid-crystal molecules twisted at an angle of 270 degrees or any other odd-integer multiple of ninety degrees.

A composite image is produced on the display 20 by selectively charging and discharging the capacitors 45 at the pixel locations 22 to produce light and dark regions on the display 20.

The same basic principles apply to the operation of the multi-state and color embodiments of the prior-art displays described above except that the opacity of a multi-state display 20 is varied at each pixel location by applying a variable charge to the capacitor 45 at the pixel location 22. In this way, the liquid-crystal molecules 46 are partially aligned, and light passing through the liquid-crystal layer 34 is rotated by an angle dependent upon the degree of alignment of the liquid-crystal molecules 46. Thus, the component of the polarized light that is parallel to the polarizing filter 42 passes through the filter 42, while the perpendicular component of the light is blocked.

Figure 4:
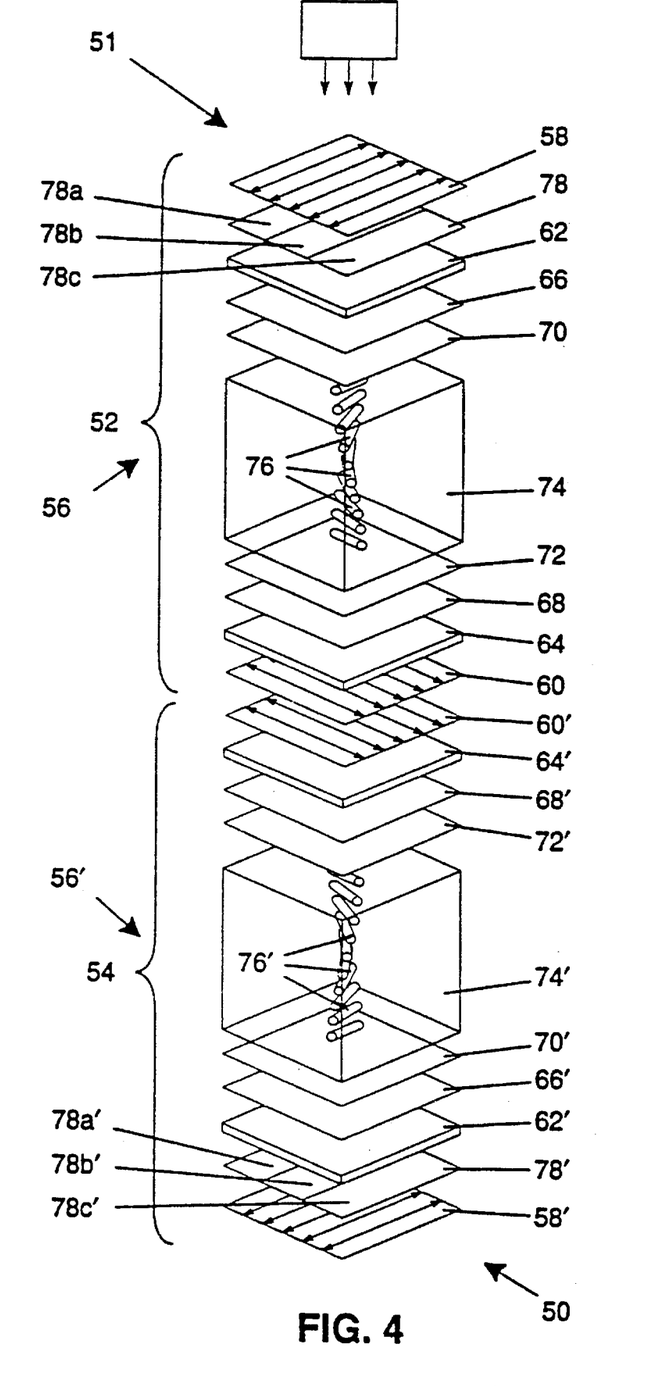
FIG. 4 comprises an exploded isometric view of a pixel location of a display in accordance with the present invention.

FIG. 4 depicts a single pixel 50 of a display 51 in accordance with the present invention. The display 51 includes first and second display layers 52, 54 wherein each display layer 52, 54 preferably comprises a plurality of pixels 50 arranged in a regular array, similar to the prior-art display 20 described above. In fact, the display 51 is preferably formed by stacking two of the prior-art displays 20, one of which has been inverted, so that the pixel locations 22 and optical filters (described below) of one display 20 are aligned with corresponding pixel locations 22 and optical filters of the other display 20. A greater number of prior-art displays 20 may be so stacked, if desired. Alternatively, the display layers 52, 54 may be formed as part of an integral display. Again, more than two display layers can be used in the integral display, if desired.

It should be noted that while the pixel 50 shown in FIG. 4 is oriented vertically, in operation, a liquid-crystal display in accordance with the present invention may be oriented in any convenient direction.

The display layers 52, 54 include cells 56, 56', respectively, wherein each cell 56, 56' includes a plurality of layers similar to the layers 26–42 of the cell 23 of the prior-art display 20 depicted in FIG. 2. Specifically, the cell 56 of the display layer 52 includes a pair of plane-polarizing filters 58, 60, the polarization directions of which are perpendicular to one another, and a pair of transparent glass substrates 62, 64 disposed between the polarizing filters 58, 60. A thin-film-transistor array layer 66, preferably having portions composed of indium tin oxide and portions composed of a suitable semiconductor, is formed on a lower surface of the transparent glass substrate 62, and a transparent electrode film layer 68, preferably composed of indium tin oxide, is formed on an upper surface of the transparent glass substrate 64. In the thin-film-transistor array layer 66, a thin-film transistor 44 and a first capacitor plate of a capacitor 45 (not shown in FIG. 4) are fabricated at each pixel location 50. A second capacitor plate (not shown) is fabricated in the transparent electrode film layer 68 at each pixel location 50.

A pair of orientation membranes 70, 72 are formed on the lower surface of the thin-film-transistor array layer 66 and the upper surface of the transparent electrode film layer 68, respectively. A liquid-crystal layer 74 containing liquid-crystal molecules 76 is disposed between the orientation membranes 70 and 72. As in the prior-art display 20, the lower surface of the orientation membrane 70 and the upper surface of the orientation membrane 72 are treated in any conventional manner known in the art to cause the twisted-nematic liquid-crystal molecules 76 in the liquid-crystal layer 74 to normally be twisted at an angle of ninety degrees between the orientation membranes 70, 72.

The cell 56' of the display layer 54 is identical to the cell 56 of the display layer 52, and the layers of the cell 56' are identified by reference numerals matching those identifying the corresponding layers of the cell 56, with the exception of the use of a prime mark (').

As shown in FIG. 4, the cell 56' preferably includes a polarizing filter 60', the direction of polarization of which is parallel to the direction of polarization of the polarizing filter 60 of the cell 56. In this embodiment, the display 51 can be formed by stacking two unmodified prior-art displays 20 as described above. The polarizing filters 60 and 60' are then disposed at the boundary between the cell 56 of the display layer 52 and the cell 56' of the display layer 54 as shown in FIG. 4.

Alternatively, at least one of the polarizing filters 60, 60' could be omitted. In this alternative embodiment, however, the removal of the pre-attached polarizing filters 60, 60' from those prior-art displays 20 that include integrated or pre-attached polarizing filters 60, 60' makes the manufacture of this embodiment of the display 51 somewhat more cumbersome and costly than the embodiment using two unmodified prior-art displays 20.

In the color display embodiment, each cell 56 and 56' actually comprises three subcells, each of which is nearly identical to a cell 56 or 56' of the monochrome embodiment. However, each cell 56 or 56' is provided with a color-subtracting optical filter 78 comprising three filter portions 78a–78c or 78a'–78c' for enabling the display to produce a color image. The filter portions 78a–78c, 78a'–78c' are aligned with respective subcells so that at each pixel location 50, light passing through each of the subcells is filtered through one of the filter portions 78a–78c, 78a'–78c' to produce red, green, and blue light on the display. Further, by providing a variable charge on the capacitors 45 at the pixel locations 50 of the color display 51, the color display 51 can be made to produce varying intensities of red, green, and blue light in the same way that varying luminous intensities are produced in a multi-state display 51.

Figure 5:
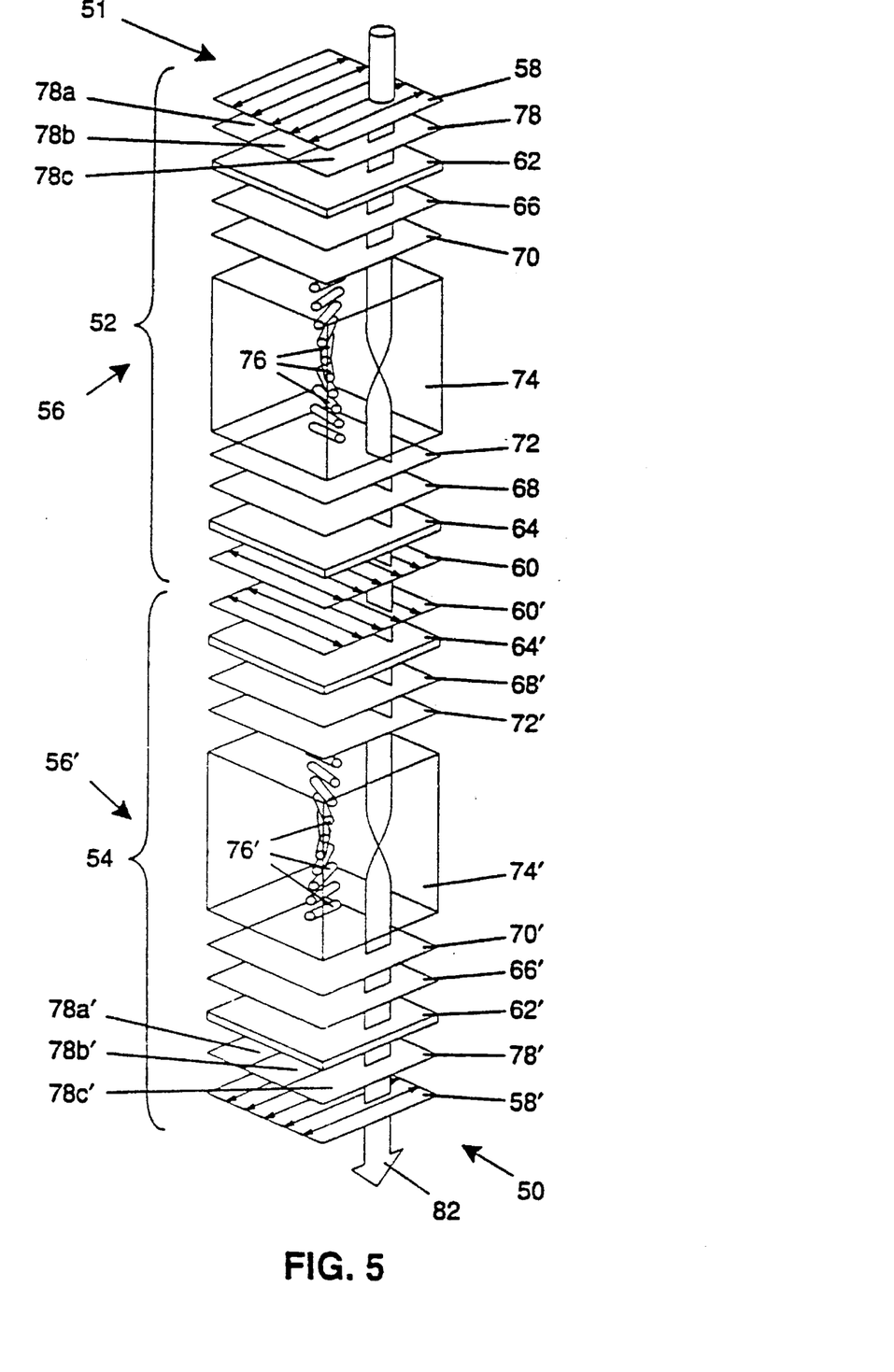
FIG. 5 comprises an exploded isometric view of the pixel location of FIG. 4, wherein both cells at the pixel location are in a light-transmitting state.

Referring now to FIG. 5, at each pixel location 50, each display layer 52, 54 may be either transparent or opaque, depending upon whether the capacitor 45 at the pixel location 50 is charged or uncharged. Preferably, each of the display layers 52, 54 is transparent at each pixel location 50 where the capacitor 45 of the respective display layer 52, 54 is uncharged. In that case, because the display layers 52, 54 are stacked so that the cells 56, 56' of the two display layers 52, 54 are aligned, plane-polarized light 82 passes serially through the two display layers 52, 54 as shown in FIG. 5.

Figure 6A:
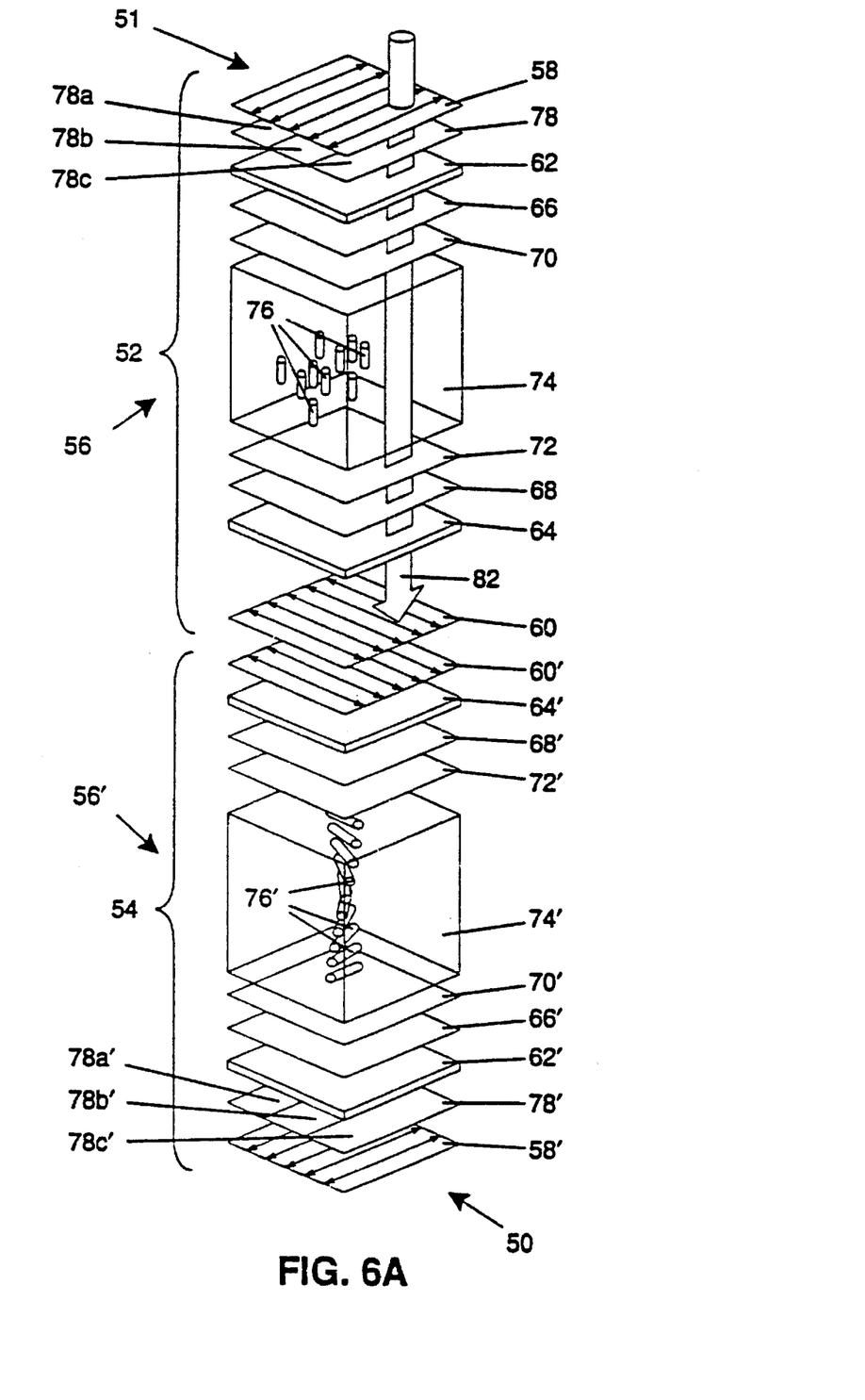
FIGS. 6A–6B are views similar to FIG. 5 wherein one cell at the pixel location is in a light-transmitting state and another cell at the pixel location in a light-blocking state.
Figure 6B:
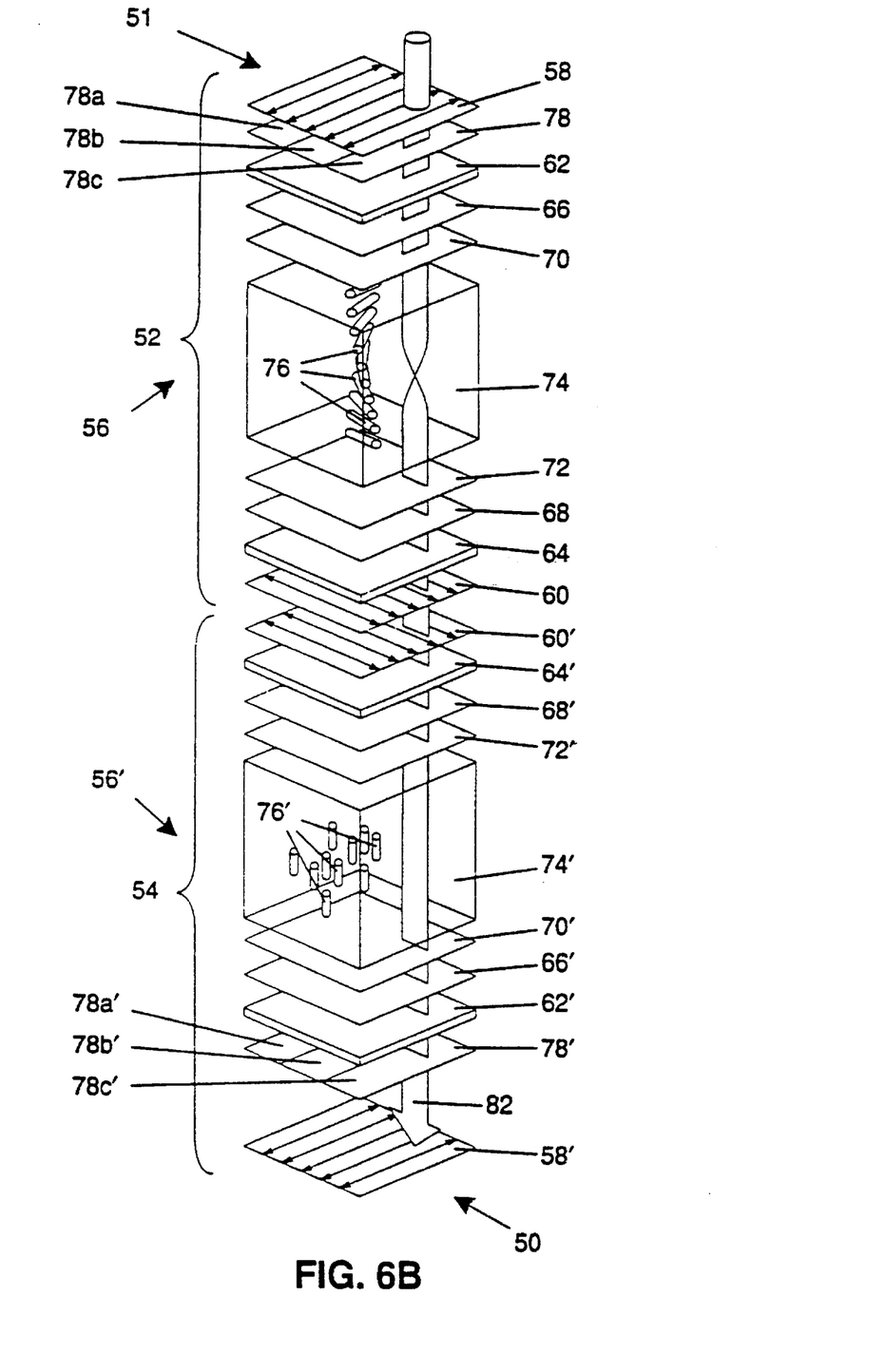

Referring now to FIGS. 6A and 6B, at each pixel location 50 of the display, either the cell 56 of the display layer 52 or the cell 56' of the display layer 54 may act as an optical shutter and block light from passing through the display at the pixel location 50. Specifically, when the capacitor formed in the cell 56 at a pixel location 50 is charged, an electric field is applied across the liquid-crystal layer 74 at the pixel location 22 (from top to bottom as seen in FIG. 6A). The electric field causes the liquid-crystal molecules 76 to align so that the polarization direction of the plane-polarized light passing through the cell 56 will not be rotated. As a result, the plane-polarized light 82 is blocked, as seen in FIG. 6A, by the polarizing filter 60 which has a polarization direction perpendicular to the unrotated, plane-polarized light 82.

As seen in FIG. 6B, identical behavior is exhibited by the cell 56' of the display layer 54 when the capacitor 45 in that layer is charged. Thus, the display will be opaque or dark at the pixel location 50 if one or both of the capacitors 45 at the pixel location 50 are charged.

If the display layers 52, 54 are operated simultaneously and independently, the composite image produced by the display 51 will be free of defects provided that at least one of the cells 74, 74' at each pixel location 50 responds properly. It should be noted, however, that a multi-state version of the present display will not function properly if operated in this manner because only half of the desired light modulation will be realized at those pixel locations 50 where one of the cells 56 or 56' fails. Instead, a multi-state embodiment of the display 51 employs only one of the cells 56 or 56' at each pixel location. For example, if two prior-art displays 20 are used as the display layers 52, 54, the composite image can be displayed on either one of these display layers 52, 54, and the other display layer can be operated only at those pixel locations 50 where a pixel failure exists in the first display layer. A bi-state display 51 (monochrome or color) can also be operated in this manner.

In either method of operation, an even greater reduction in the likelihood of pixel failures is achieved by providing additional display layers similar to the layers 52, 54 in accordance with the present invention.

Moreover, although the display 51 described above is normally transparent, the display 51 could be made normally opaque by aligning the polarization directions of at least one pair of polarizing filters 58, 60 or 58', 60' so that they are parallel. As in the normally-transparent embodiment of the display 51, however, the polarization directions of the central polarizing filters 60 and 60' must be parallel. In this embodiment, the display 51 is transparent at all and only those pixel locations 22 where the capacitors 45 are (1) charged in display layers 52, 54 in which the polarizing filters have parallel polarization directions and (2) uncharged in display layers 52, 54 in which the polarizing filters have perpendicular polarization directions.

To illustrate the efficacy of the present invention, the following theoretical yield analysis is presented. For a display 51 comprised of two separate prior-art displays 20, the probabilities of pixel failures in the two displays are substantially independent. If the probability that one display 20 will fail at a particular pixel location 22 is P, then the probability that both displays 20 will fail at corresponding pixel locations 22 (i.e., the probability that the display 51 will not modulate light at the particular pixel location 22) is $P^2$. For example, a display 51 comprised of two displays 20, each having 750 pixels/cm² and a defect density of $3.0\times10^{-3}$ defects/cm², yields $$\frac{3.0 \times 10^{-3} \text{ defects/cm}^2}{750 \text{ pixels/cm}^2} = 4.0 \times 10^{-6}$$

defects/pixel. Thus, $P=4.0\times10^{-6}$, and hence $P^2=1.6\times10^{-11}$. Accordingly, such a display 51 will have a defect density of $1.2\times10^{-8}$ defects/cm² ($1.6\times10^{-11}$ defects/pixel×750 pixels/cm²)—significantly lower than the defect density of the single-layer prior-art displays 20.

Numerous modifications and alternative embodiments of the invention will be apparent to those skilled in the art in view of the foregoing description which describes many such modifications and alternative embodiments. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A display having a plurality of pixel locations, comprising:

first and second display layers, each including a cell at each pixel location, wherein each cell includes means for modulating light passing through the display and means for controlling the modulating means of the cell;

wherein the controlling means of a cell at a pixel location operates independently of the controlling means of another cell at the pixel location.

2. The display of claim 1, wherein at least one of the display layers comprises a flat panel display.

3. The display of claim 1, wherein the pixel locations are arranged in an array.

4. The display of claim 1, wherein the pixel locations are arranged in a regular array.

5. The display of claim 1, wherein each cell of each display layer may be in a first state wherein light is substantially permitted to pass through the display layer at the cell and a second state wherein light is substantially prevented from passing through the display layer at the cell.

6. The display of claim 1, wherein each cell at each pixel location may be in first and second states, and wherein the display has a first appearance at a particular pixel location when all of the cells at the particular pixel location are in the first state, and the display has a second appearance at the particular pixel location when a cell at the particular pixel location is in the second state.

7. The display of claim 1, wherein each modulating means at each of the pixel locations may be in first and second states, and wherein light is substantially permitted to pass through the display at a particular pixel location when all of the modulating means at the particular pixel location are in the first state, and light is substantially blocked at the particular pixel location when a modulating means at the particular pixel location is in the second state.

8. The display of claim 1, wherein each modulating means at each of the pixel locations may be in first and second states, and wherein the display has a first appearance at a particular pixel location when all of the modulating means at the particular pixel location are in the first state, and the display has a second appearance at the particular pixel location when a modulating means at the particular pixel location is in the second state.

9. The display of claim 1, wherein at least one of the modulating means at a pixel location variably attenuates light passing through the display at the pixel location.

10. The display of claim 1, wherein each controlling means comprises a capacitor and a thin-film transistor associated with the capacitor.

11. The display of claim 10, wherein each controlling means further includes means for selectively charging and discharging at least one of the capacitors at a pixel location.

12. The display of claim 10, wherein each controlling means further includes means for selectively charging and discharging each of the capacitors at a pixel location.

13. The display of claim 10, wherein each capacitor at each of the pixel locations may be in first and second states, and wherein light is substantially permitted to pass through the display at a particular pixel location when all of the capacitors at the particular pixel location are in the first state, and light is substantially blocked at the particular pixel location when a capacitor at the particular pixel location is in the second state.

14. The display of claim 10, wherein each capacitor at each of the pixel locations may be in first and second states, and wherein the display has a first appearance at a particular pixel location when all of the capacitors at the particular pixel location are in the first state, and the display has a second appearance at the particular pixel location when a capacitor at the particular pixel location is in the second state.

15. The display of claim 10, wherein each controlling means further includes means for selectively charging and discharging a capacitor at a pixel location.

16. The display of claim 1, wherein each of the display layers comprises a plurality of cells at each pixel location, each including means for modulating light passing through the display and means for controlling the modulating means, and wherein the display further comprises an optical filter associated with at least one of the cells at each pixel location.

17. The display of claim 1, wherein each modulating means comprises a liquid-crystal layer.

18. The display of claim 1, wherein each modulating means is selected from a group consisting of active-matrix liquid-crystal displays, passive-matrix liquid-crystal displays, mechanical-shutter displays, plasma displays, and deformable-mirror displays.

19. A display having a plurality of pixel locations, comprising:
    first and second display layers, each including a cell at each pixel location, wherein each cell includes means for modulating light passing through the display and means for controlling the modulating means;
    wherein each controlling means comprises a capacitor and a thin-film transistor associated with the capacitor, and wherein at least one of the capacitors at a particular pixel location stores a variable charge enabling the modulating means at the particular pixel location to variably attenuate light passing through the display at the particular pixel location.

20. A display having a plurality of pixel locations, comprising:
    first and second display layers, each including a cell at each pixel location, wherein each cell includes means for modulating light passing through the display and means for controlling the modulating means;
    wherein each modulating means comprises a mechanical shutter, and wherein the controlling means at a particular pixel location comprises means for opening and closing the mechanical shutter at the particular pixel location.

21. A flat panel display having a plurality of pixel locations arranged in a regular array, comprising:
    first and second display layers, each including a cell at each pixel location wherein the cells of the first display layer are aligned with corresponding cells of the second display layer;
    each cell of each display layer including a liquid-crystal layer which may be in a first state wherein light is substantially permitted to pass through the display layer at the cell and a second state wherein light is substantially prevented from passing through the display layer at the cell; and
    causing means for each cell for causing the liquid-crystal layers to be in one of the first and second states;
    wherein the causing means of the cells at each pixel location operate independently of one another.

22. The display of claim 21, wherein each cell includes a capacitor and wherein the liquid-crystal layer of a cell is in one state when the capacitor of the cell is charged and is in the other state when the capacitor of the cell is uncharged.

23. The display of claim 21, wherein at least one of the liquid-crystal layers at a particular pixel location variably attenuates light passing through the display at the particular pixel location.

24. The display of claim 21, wherein each of the display layers comprises a plurality of cells at each pixel location, each including a liquid-crystal layer for modulating light passing through the display and means for controlling the liquid-crystal layer, and wherein the display further comprises an optical filter associated with at least one of the cells at each pixel location.

25. A flat panel display having a plurality of pixel locations arranged in a regular array, comprising:
    first and second display layers, each including a cell at each pixel location, wherein the cells of the first display layer are aligned with corresponding cells of the second display layer;
    each cell including a liquid-crystal layer which may provide attenuation of light passing through the cell in a range of levels between a first level and a second level greater than the first level, wherein at a particular cell, light is substantially blocked at the particular cell when the liquid-crystal layer at the particular cell provides the second level of attenuation; and
    means for causing the liquid-crystal layers to provide a particular level of attenuation.

26. A flat panel display having a plurality of pixel locations arranged in a regular array, comprising:
    first and second display layers, each including a plurality of cells at each pixel location, wherein each cell of each display layer includes a liquid-crystal layer which may be in a first state wherein light is substantially permitted to pass through the display layer at the cell and a second state wherein light is substantially prevented from passing through the display layer at the cell, wherein the state of the first display layer is independent of the state of the second display layer; and an optical filter associated with at least one of the cells at each pixel location.

27. A method of displaying a composite image, comprising the steps of:

providing first and second display layers, each having a plurality of pixel locations and a cell at each of the pixel locations, wherein each cell includes means for modulating light passing through the display at the cell and means for independently controlling the modulating means;

combining the first and second display layers so that the pixel locations of the first display layer are aligned with the pixel locations of the second display layer; and operating the controlling means to selectively control the modulating means of at least one of the cells at each of the pixel locations.

28. A method of making a display for modulating light at each of a plurality of pixel locations of the display, comprising the steps of:

providing first and second display layers, each having a plurality of pixel locations and a cell at each of the pixel locations;

providing independent means at each cell for modulating light passing through the display at the cell; and combining the first and second layers so that the pixel locations of the first layer are aligned with the pixel locations of the second layer.

29. A flat panel display having a plurality of pixel locations arranged in a regular array, comprising:

first and second display layers, each including a cell at each pixel location, wherein the cells of the first display layer are aligned with corresponding cells of the second display layer;

each cell including a liquid-crystal layer for providing attenuation of light passing through the cell in a range of levels between a first level and a second level greater than the first level, wherein at a particular cell, light is substantially blocked at the particular cell when the liquid-crystal layer at the particular cell provides the second level of attenuation; and causing means for each cell for causing the liquid-crystal layers to provide a particular level of attenuation;

wherein the causing means of the cells at each pixel location operate independently of one another.

* * * * *